(12) United States Patent
Miyazawa

(10) Patent No.: US 12,472,821 B2
(45) Date of Patent: Nov. 18, 2025

(54) VEHICLE DISPLAY DEVICE

(71) Applicant: Yazaki Corporation, Tokyo (JP)

(72) Inventor: Tomohiro Miyazawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/947,596

(22) Filed: Nov. 14, 2024

(65) Prior Publication Data

US 2025/0065719 A1 Feb. 27, 2025

Related U.S. Application Data

(63) Continuation of application No. PCT/JP2023/020217, filed on May 31, 2023.

(30) Foreign Application Priority Data

Jul. 5, 2022 (JP) .................................. 2022-108505

(51) Int. Cl.
*G09G 5/00* (2006.01)
*B60K 35/231* (2024.01)
*G02B 27/01* (2006.01)

(52) U.S. Cl.
CPC ........ *B60K 35/231* (2024.01); *G02B 27/0101* (2013.01); *G02B 27/0149* (2013.01); *G02B 2027/011* (2013.01); *G02B 2027/0161* (2013.01)

(58) Field of Classification Search
CPC .............. B60K 35/231; G02B 27/0101; G02B 27/0149

USPC ............................................................ 345/7
See application file for complete search history.

(56) References Cited

U.S. PATENT DOCUMENTS

| | | | |
|---|---|---|---|
| 2006/0209419 A1* | 9/2006 | Dobschal | G02B 27/0101 359/630 |
| 2007/0069356 A1* | 3/2007 | Yoda | B81B 7/0067 257/680 |
| 2017/0235138 A1* | 8/2017 | Morohashi | G02B 27/0101 359/631 |
| 2018/0246256 A1* | 8/2018 | Abe | B29D 11/00884 |
| 2018/0335627 A1* | 11/2018 | Fujita | G02B 27/01 |
| 2019/0271842 A1* | 9/2019 | Fujita | G02B 27/01 |
| 2021/0215934 A1* | 7/2021 | Mizuochi | G02B 27/0006 |
| 2023/0004002 A1 | 1/2023 | Kusafuka et al. | |

FOREIGN PATENT DOCUMENTS

| | | |
|---|---|---|
| JP | 2008-268883 A | 11/2008 |
| JP | 2019-089480 A | 6/2019 |
| WO | 2020/183844 A1 | 9/2020 |
| WO | 2021/106688 A1 | 6/2021 |

* cited by examiner

*Primary Examiner* — Jonathan M Blancha
(74) *Attorney, Agent, or Firm* — Sughrue Mion, PLLC

(57) ABSTRACT

A vehicle display device includes: a housing mounted on a vehicle and having an opening facing a windshield; an image display device that is disposed inside the housing and outputs display light of an image; a mirror that is disposed inside the housing, faces the windshield through the opening, and reflects the display light toward the windshield; a cover that is transparent, disposed at the opening and having a free-form surface formed to have an optical function; and a suppression means that is disposed at an edge of the cover and suppresses reflection of light on an end surface of the cover.

10 Claims, 12 Drawing Sheets

VEHICLE DISPLAY DEVICE

CROSS-REFERENCE TO RELATED APPLICATION

This application is a continuation application of International Application PCT/JP2023/020217, filed on May 31, 2023 which claims the benefit of priority from Japanese Patent Application No. 2022-108505 filed on Jul. 5, 2022 and designating the U.S., the entire contents of which are incorporated herein by reference.

BACKGROUND OF THE INVENTION

1. Field of the Invention

The present invention relates to a vehicle display device.

2. Description of the Related Art

Conventionally, there is a display device for a vehicle. Japanese Patent Application Laid-open No. 2008-268883 discloses a HUD device that allows image light transmitted through a cylindrical lens to be reflected on a front windshield to allow an occupant of a vehicle to view a virtual image of the image light. In the HUD device in Japanese Patent Application Laid-open No. 2008-268883, the cylindrical lens is disposed so as to be inclined with respect to the image light so that the external light reflected on the cylindrical lens does not reach an eye range of the occupant of the vehicle.

There is still room for improving a vehicle display device in terms of improving visibility by suppressing occurrence of ghost images due to external light or the like. For example, in a case where display light is projected through a transparent cover, it is desirable to be able to suppress the reflection of light on an end surface of the cover.

SUMMARY OF THE INVENTION

An object of the present invention is to provide a vehicle display device capable of suppressing reflection on an end surface of a cover.

To achieve the above-described objective, a vehicle display device according to one aspect of the present invention includes a housing mounted on a vehicle and having an opening facing a windshield; an image display device that is disposed inside the housing and outputs display light of an image; a mirror that is disposed inside the housing, faces the windshield through the opening, and reflects the display light toward the windshield; a cover that is transparent, disposed at the opening and having a free-form surface formed to have an optical function; and a suppression means that is disposed at an edge of the cover and suppresses reflection of light on an end surface of the cover.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a vehicle display device according to an embodiment of the present invention will be described in detail with reference to the drawings. Note that the present invention is not limited by the embodiment. Moreover, components in the following embodiment include those that are easily conceivable for those skilled in the art or substantially identical.

EMBODIMENT

Figure 1:
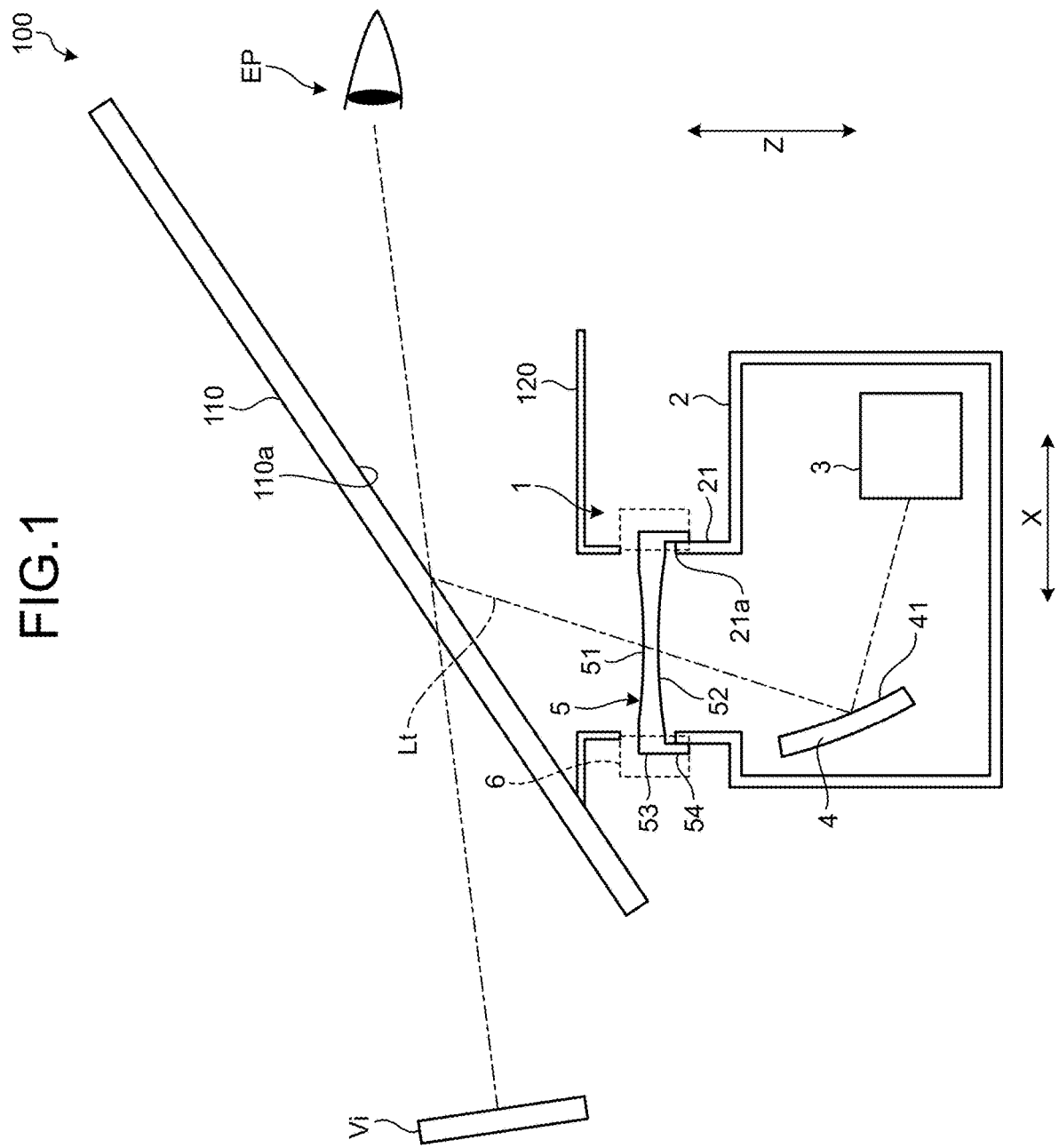
FIG. 1 is a diagram illustrating a vehicle equipped with a vehicle display device according to an embodiment.
Figure 6:
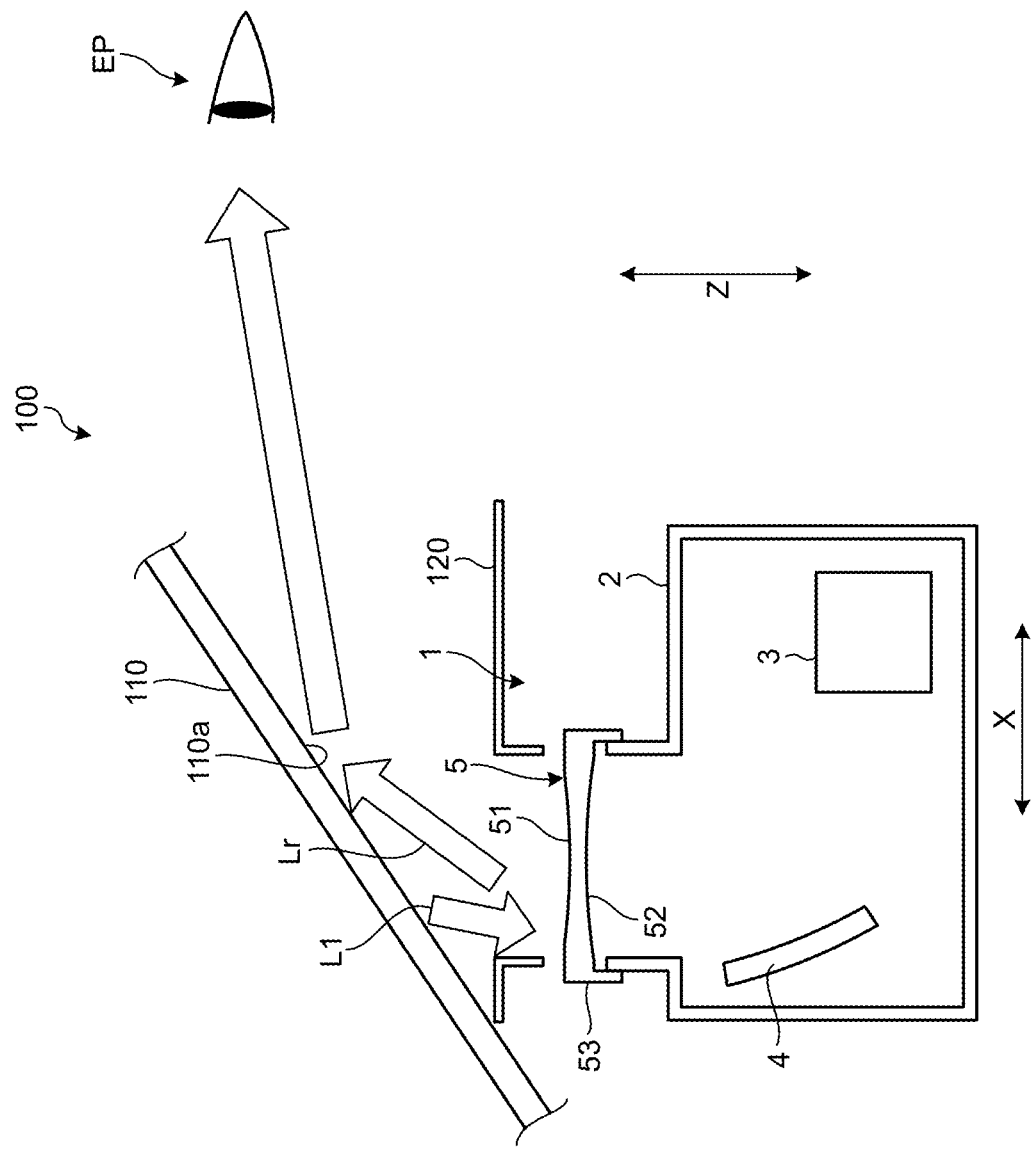
FIG. 6 is a diagram illustrating a path of reflected light.
Figure 7:
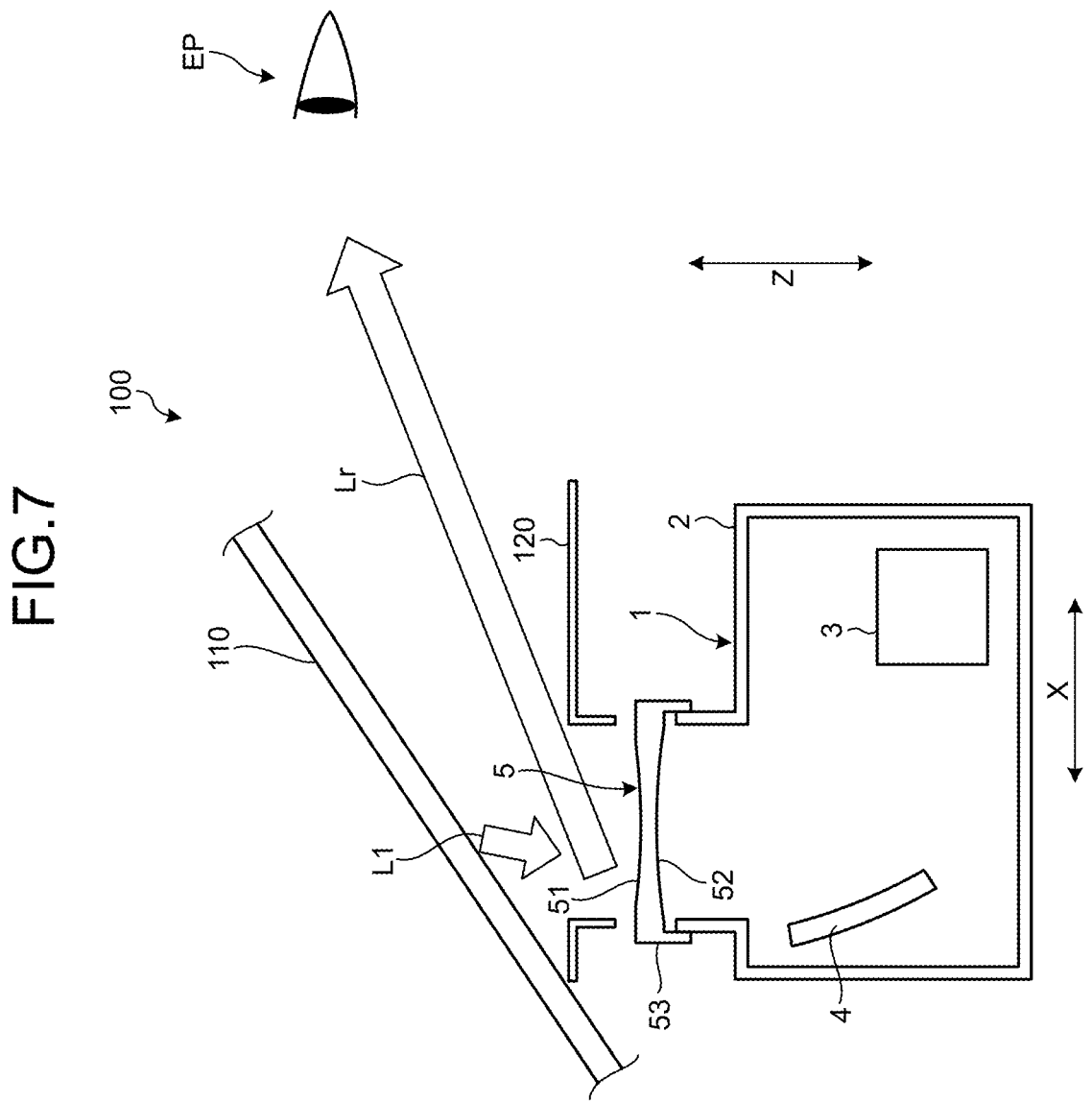
FIG. 7 is a diagram illustrating a path of reflected light.
Figure 8:
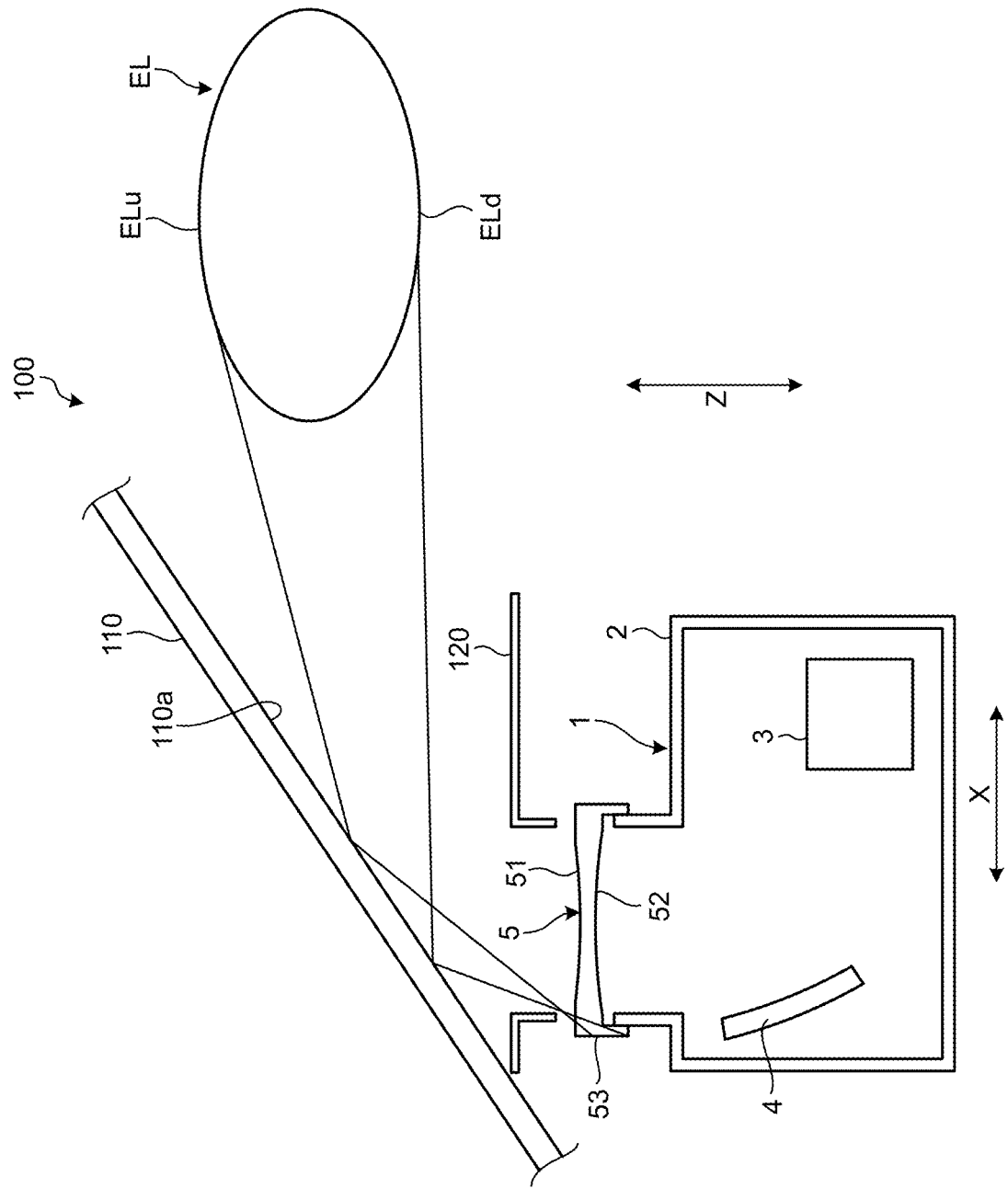
FIG. 8 is a diagram illustrating a path according to a position of an eye.
Figure 9:
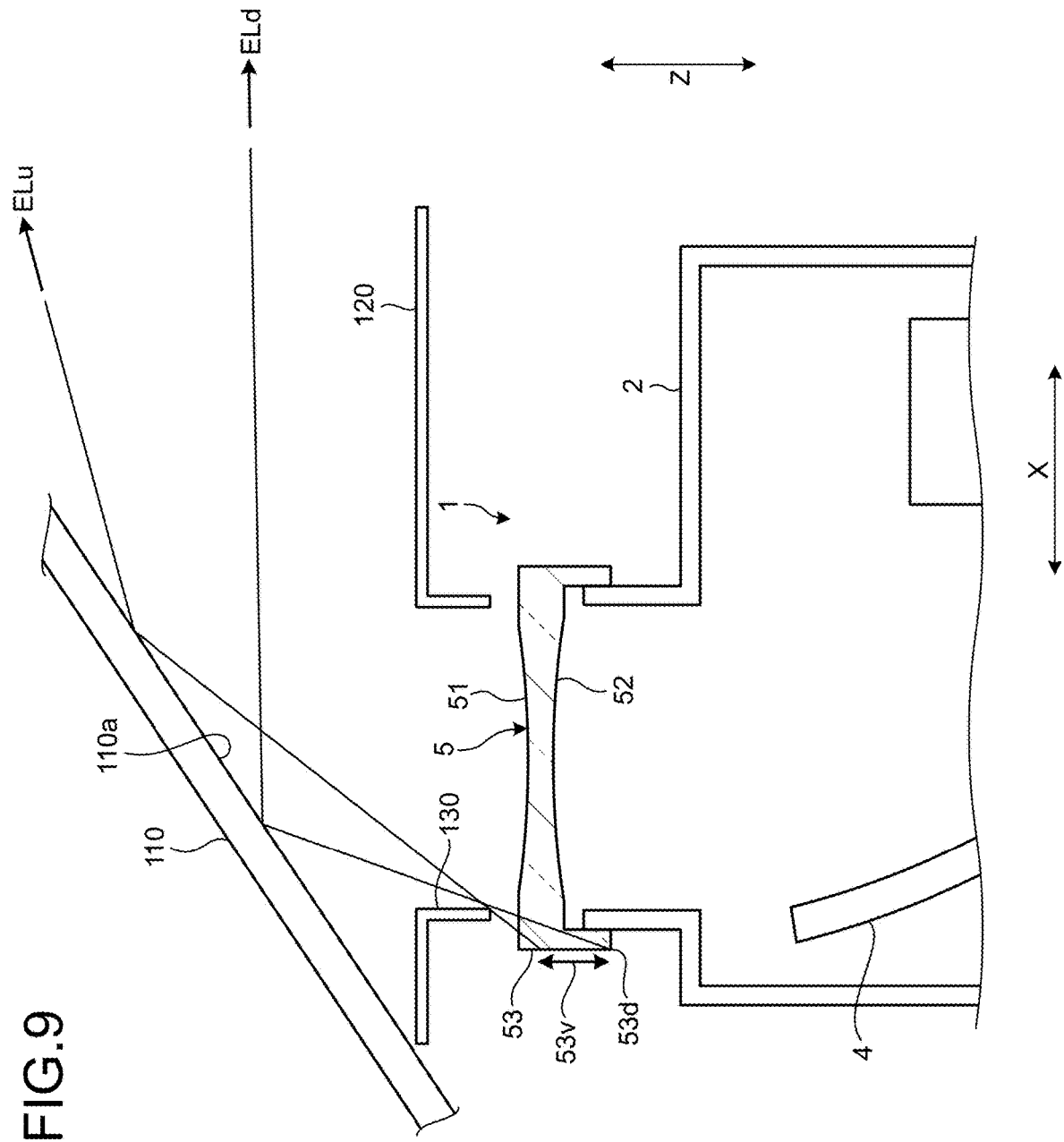
FIG. 9 is a diagram illustrating a path according to a position of an eye.
Figure 10:
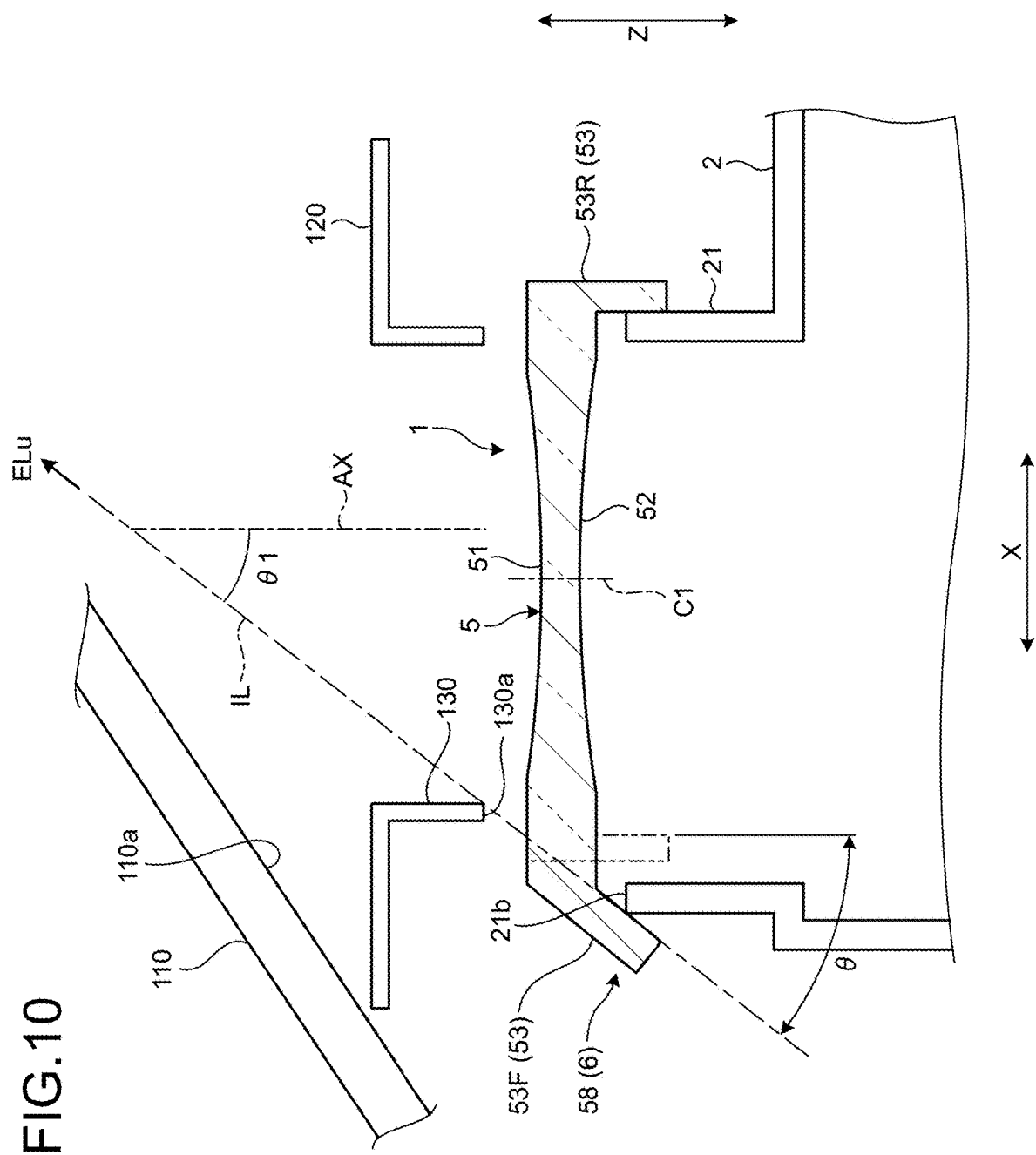
FIG. 10 is a cross-sectional view of the vehicle display device according to the embodiment.
Figure 11:
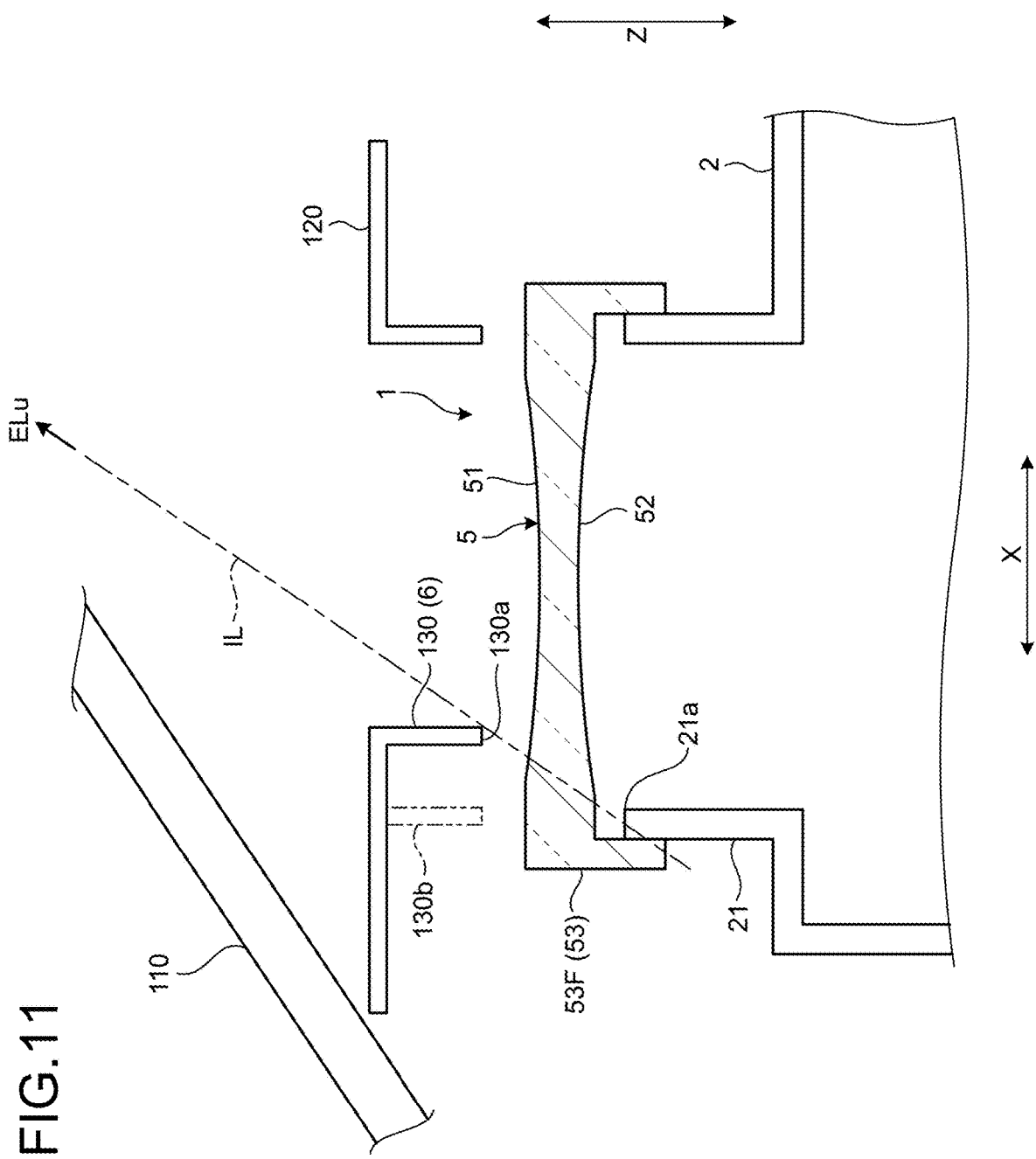
FIG. 11 is a cross-sectional view of the vehicle display device according to the embodiment.
Figure 12:
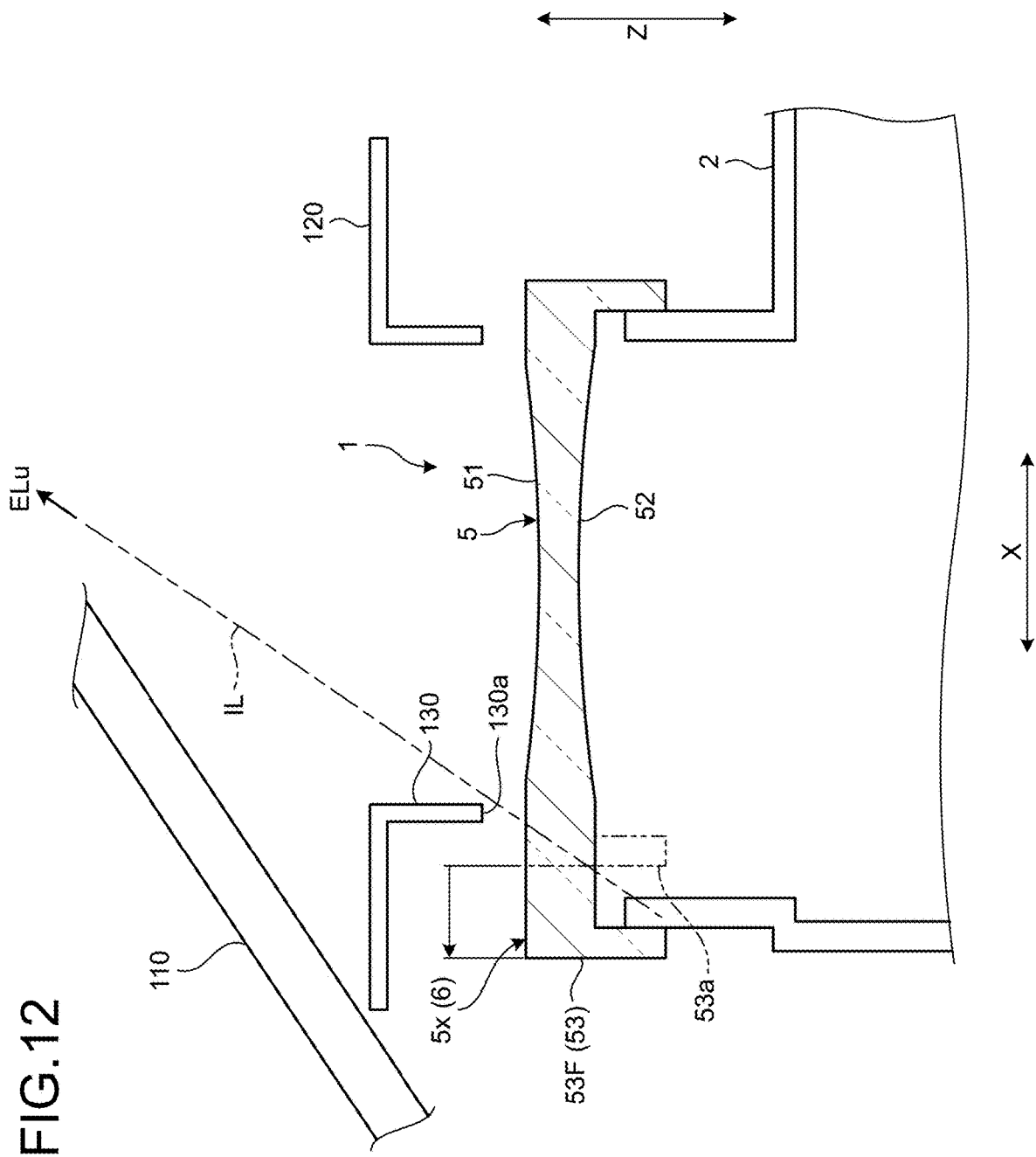
FIG. 12 is a cross-sectional view of the vehicle display device according to the embodiment.

An embodiment will be described with reference to FIGS. 1 to 12. The present embodiment relates to a vehicle display device. FIG. 1 is a diagram illustrating a vehicle equipped with a vehicle display device according to the embodiment; FIGS. 2 to 5 are cross-sectional views of the vehicle display device according to the embodiment; FIGS. 6 and 7 are diagrams illustrating a path of reflected light; FIGS. 8 and 9 are diagrams illustrating a path according to a position of an eye; and FIGS. 10 to 12 are cross-sectional views of the vehicle display device according to the embodiment. Each cross-sectional view illustrates a cross section along a vehicle front-rear direction and a vehicle up-down direction.

As illustrated in FIG. 1, a vehicle display device 1 according to the present embodiment is a head-up display device mounted on a vehicle 100 such as an automobile. The vehicle display device 1 projects display light Lt of an image toward a windshield 110. The windshield 110 is located at a front position in the vehicle 100 with respect to an eye point EP of the vehicle 100, and faces the eye point EP in a vehicle front-rear direction X. The display light Lt is reflected toward the eye point EP by a reflection surface 110a of the windshield 110. A driver of the vehicle 100 can view a virtual image Vi by the display light Lt. The virtual image Vi may be displayed to be superimposed on an object in front of the vehicle 100. The virtual image Vi may be a meter image of the vehicle 100.

The vehicle display device 1 includes a housing 2, an image display device 3, a mirror 4, a cover 5, and a suppression means 6. The housing 2 is disposed at a front position in the vehicle with respect to the eye point EP, and is accommodated in an instrument panel 120, for example. The housing 2 is formed with a light-shielding material. The housing 2 has an opening 21a facing the windshield 110 in the vehicle up-down direction. The opening 21a is located at the distal end of a tubular portion 21. The tubular portion 21 protrudes upward from a main body of the housing 2. The shape of the tubular portion 21 is, for example, a rectangular tubular shape. The illustrated opening 21a is disposed at an upper end of the housing 2 and is located at a front end of the housing 2.

The image display device 3 and the mirror 4 are disposed inside the housing 2. The image display device 3 is a device that outputs the display light Lt of an image. The image display device 3 is a liquid crystal display device such as a Thin Film Transistor-Liquid Crystal Display (TFT-LCD), for example. The image display device 3 generates the display light Lt using light of a backlight unit, for example.

The mirror 4 is a reflective member that reflects the display light Lt toward the windshield 110. The mirror 4 has a reflection surface 41 having a concave shape, and is capable of enlarging an image. The reflection surface 41 of the mirror 4 is a free-form surface having an image correction function, for example. More specifically, the shape of the reflection surface 41 is designed to correct image distortion that occurs when the display light Lt is reflected by the reflection surface 110a of the windshield 110. The display light Lt reflected by the reflection surface 41 is further reflected by the windshield 110 toward the eye point EP.

The cover 5 is disposed at the opening 21a of the housing 2 and closes the opening 21a. The cover 5 is a transparent member, and is formed with a transparent resin, for example. The cover 5 has an outer surface 51 and an inner surface 52. The outer surface 51 is a surface directed toward the vehicle upper side, and faces the windshield 110. The inner surface 52 is directed toward the lower side of the vehicle and faces the mirror 4.

The cover 5 of the present embodiment has a free-form surface formed to have an optical function for the display light Lt. The free-form surface of the cover 5 corrects at least one of distortion or aberration of an image, for example. The free-form surface of the cover 5 may have a function of enlarging an image. The free-form surface may be the inner surface 52, or the outer surface 51, or both the outer surface 51 and the inner surface 52. The thickness of the cover 5 having an optical function tends to be larger than the thickness of the cover having no optical function. The average value of the thickness of the cover 5 may be about 10 [mm], for example.

The vehicle display device 1 of the present embodiment includes the suppression means 6 disposed at an edge of the cover 5. As described below, the suppression means 6 can suppress reflection of light by an end surface 53 of the cover 5 and improve visibility of the virtual image Vi.

Figure 2:
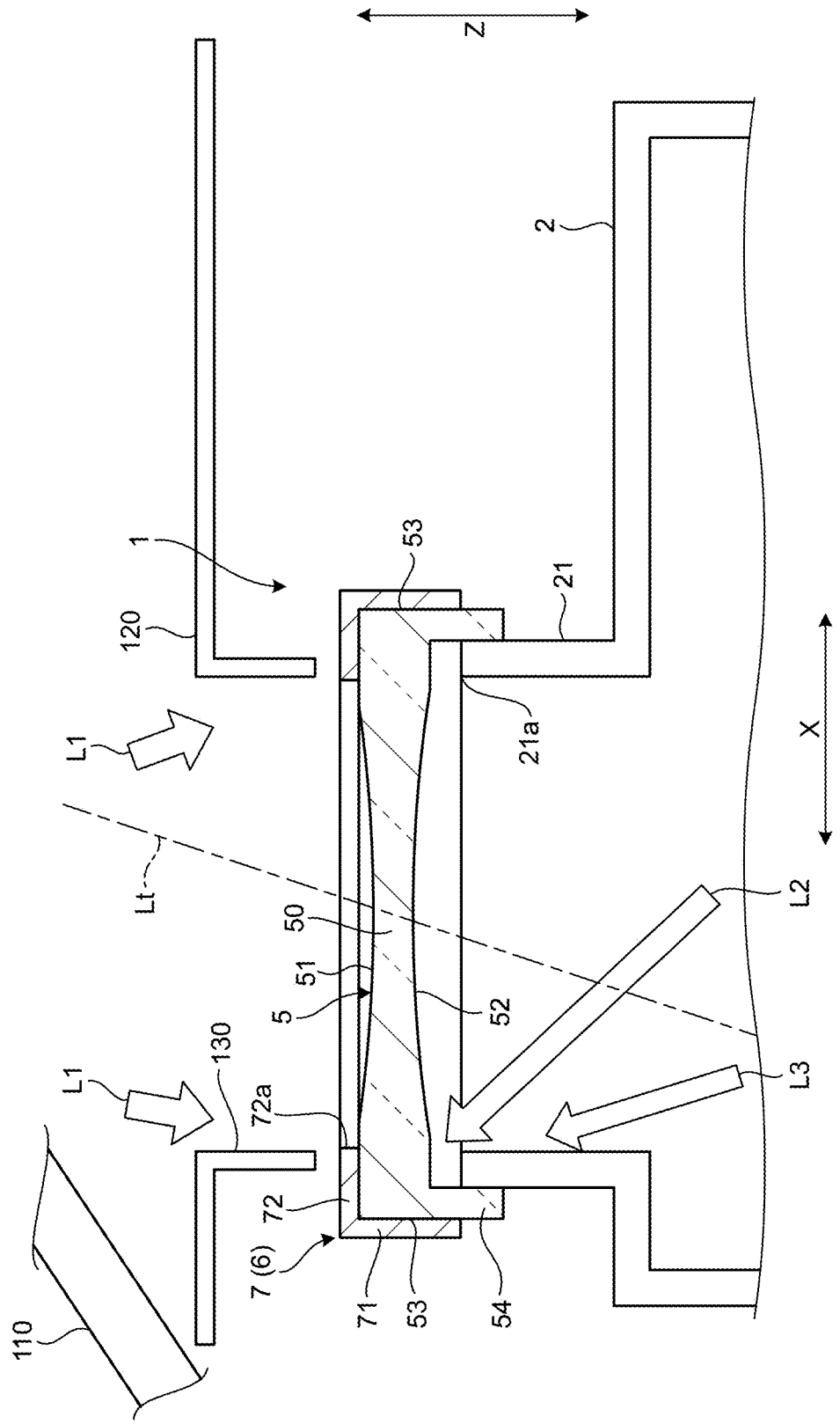
FIG. 2 is a cross-sectional view of the vehicle display device according to the embodiment.

The cover 5 illustrated in FIG. 2 is fitted to the tubular portion 21 of the housing 2. More specifically, the cover 5 includes a main body 50 and a fitting portion 54. The main body 50 is a lens portion having an optical function, and has an outer surface 51 and an inner surface 52. The fitting portion 54 protrudes from the edge of the inner surface 52 and is fitted to the tubular portion 21 from the outside. The shape of the fitting portion 54 is, for example, a rectangular tube shape.

The end surface 53 of the cover 5 is a side surface of the cover 5. The end surface 53 extends so as to surround the outer surface 51 and the inner surface 52. The end surface 53 is continuous from the main body 50 to the fitting portion 54. The end surface 53 might be subjected to incidence of external light L1 or stray light L2 and L3. The external light L1 is typically sunlight that passes through the windshield 110 toward the inside of the vehicle. The stray light L2 is light output from the image display device 3 and directly emitted toward the cover 5 without passing through the mirror 4. The stray light L3 is display light reflected by the mirror 4 toward the end surface 53 of the cover 5. The stray light includes repeatedly reflected light that is reflected inside the cover 5, on the inner surface 52, on the mirror 4, on the surface of the image display device 3, and the like, so as to be finally incident on the end surface 53. Reflection of beams of the external light L1 and the stray light L2 and L3 by the end surface 53 toward the eye point EP would lead to occurrence of ghost images, which might degrade the visibility of the virtual image Vi.

The vehicle display device 1 illustrated in FIG. 2 includes a frame member 7 as the suppression means 6. The frame member 7 is a light shielding member and covers the edge of the cover 5. The frame member 7 includes a side wall 71 and a top wall 72. The side wall 71 is a wall portion that faces the end surface 53 to cover the end surface 53. For example, the side wall 71 may cover all the end surfaces 53 of the cover 5, or may cover some end surface 53 out of all the end surfaces 53. The side wall 71 covers at least a portion of the end surface 53 corresponding to the main body 50. The exemplified side wall 71 covers not only the end surface 53 of the main body 50 but also the end surface 53 of the fitting portion 54, and is provided up to the position of the opening 21a of the housing 2. The side wall 71 may entirely cover the fitting portion 54.

The top wall 72 covers the edge of the cover 5 from a side of the windshield 110. The top wall 72 is configured to face the edge of the outer surface 51 so as to shield the end surface 53 against the external light L1. In addition, the top wall 72 can block reflected light even when beams of the stray lights L2 and L3 are reflected by the end surface 53.

The illustrated top wall 72 is provided up to a position on an extension line of a protective facing member 130. The protective facing member 130 is a light-shielding wall extending downward from the instrument panel 120. The shape of the protective facing member 130 is, for example, a rectangular tube shape. The illustrated protective facing member 130 protrudes in the vehicle up-down direction Z toward the tubular portion 21 of the housing 2. An inner end 72a of the top wall 72 faces the protective facing member 130 in the vehicle up-down direction Z. That is, the top wall 72 is provided in a range not interfering with the optical path of the display light Lt toward the eye point EP.

The facing surface of the frame member 7 facing the cover 5 desirably has low reflectance. The facing surface of the frame member 7 may have an uneven shape that diffuses light, or may have a coating to absorb light, for example. The color of the facing surface may be a dark color such as black.

The frame member 7 can suppress reflection of the external light L1 and the stray light L2 and L3 toward the eye point EP, making it possible to improve the visibility of the virtual image Vi.

Figure 3:
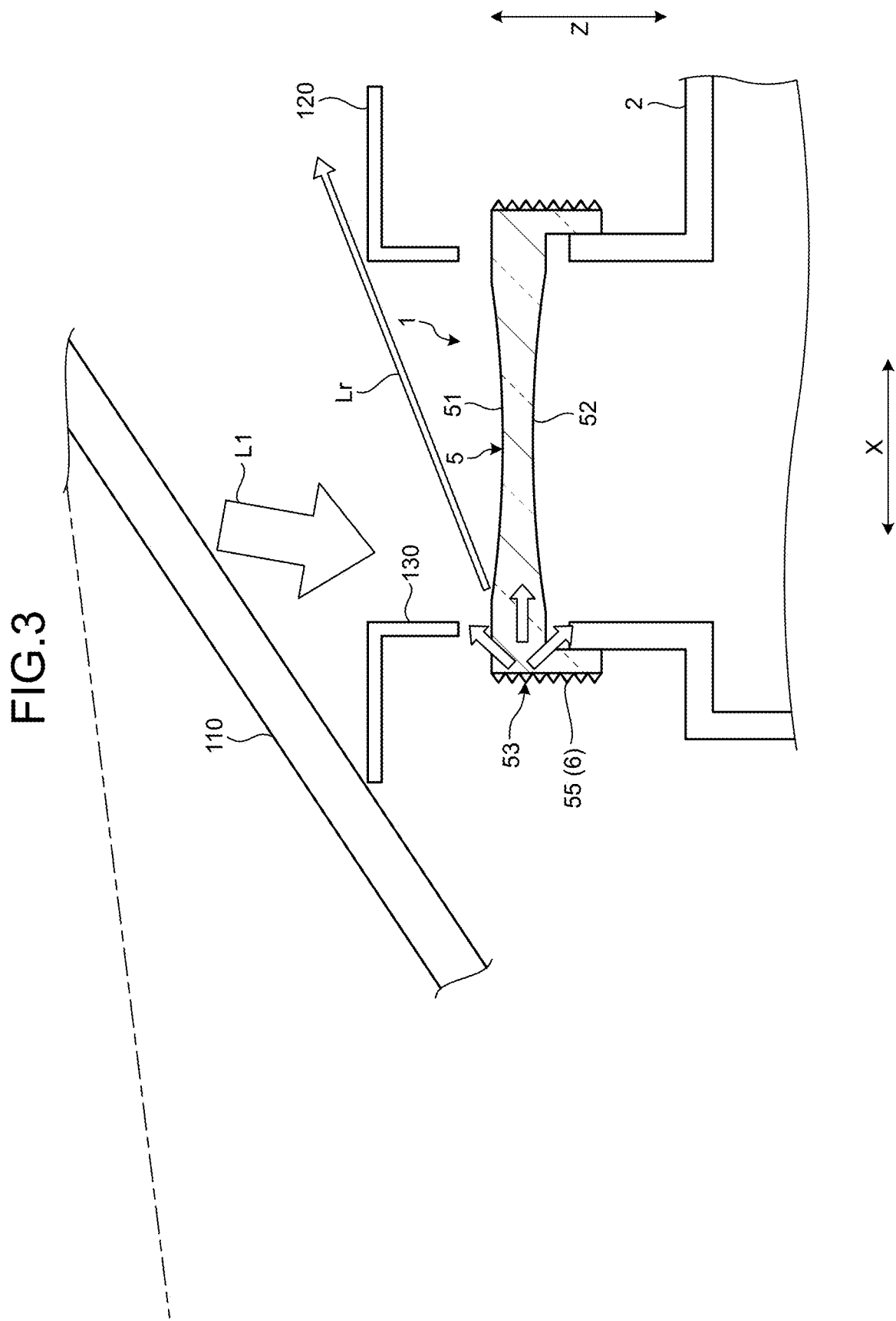
FIG. 3 is a cross-sectional view of the vehicle display device according to the embodiment.

The vehicle display device 1 illustrated in FIG. 3 includes, as the suppression means 6, texturing 55 applied to the end surface 53 of the cover 5. The end surface 53 having the texturing 55 diffuses light. For example, beams of the external light L1 or the stray light L2 or L3, when incident on the end surface 53, are diffused in various directions. This suppresses generation of reflected light Lr directed toward the eye point EP. The texturing 55 may be applied on the all end surfaces 53 of the cover 5, or applied on some end surface 53 out of all the end surfaces 53. Note that the vehicle display device 1 may include both the texturing 55 and the frame member 7 as the suppression means 6.

Figure 4:
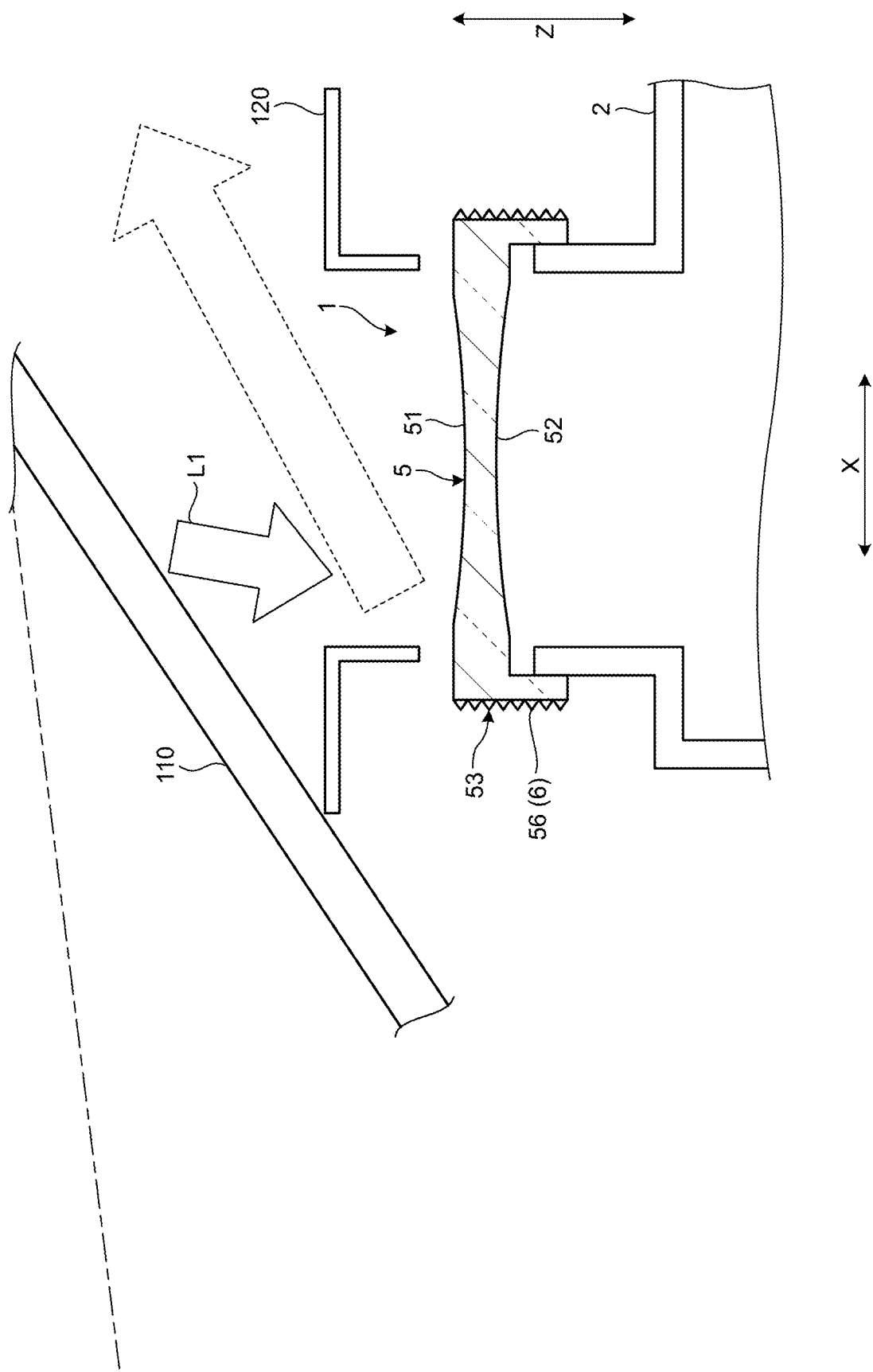
FIG. 4 is a cross-sectional view of the vehicle display device according to the embodiment.

The vehicle display device 1 illustrated in FIG. 4 includes, as the suppression means 6, a low reflectance material 56 disposed on the end surface 53. The low reflectance material 56 may be, for example, a paint coating having a low reflectance or a sheet having a low reflectance. When beams of the external light L1 and the stray light L2 and L3 are incident on the end surface 53, the low reflectance material 56 absorbs these beams of light to reduce reflected light. The low reflectance material 56 may be applied on all the end surfaces 53 of the cover 5, or applied on some end surface 53 out of all the end surfaces 53. Note that the vehicle display device 1 may include both the low reflectance material 56 and the frame member 7 as the suppression means 6.

Figure 5:
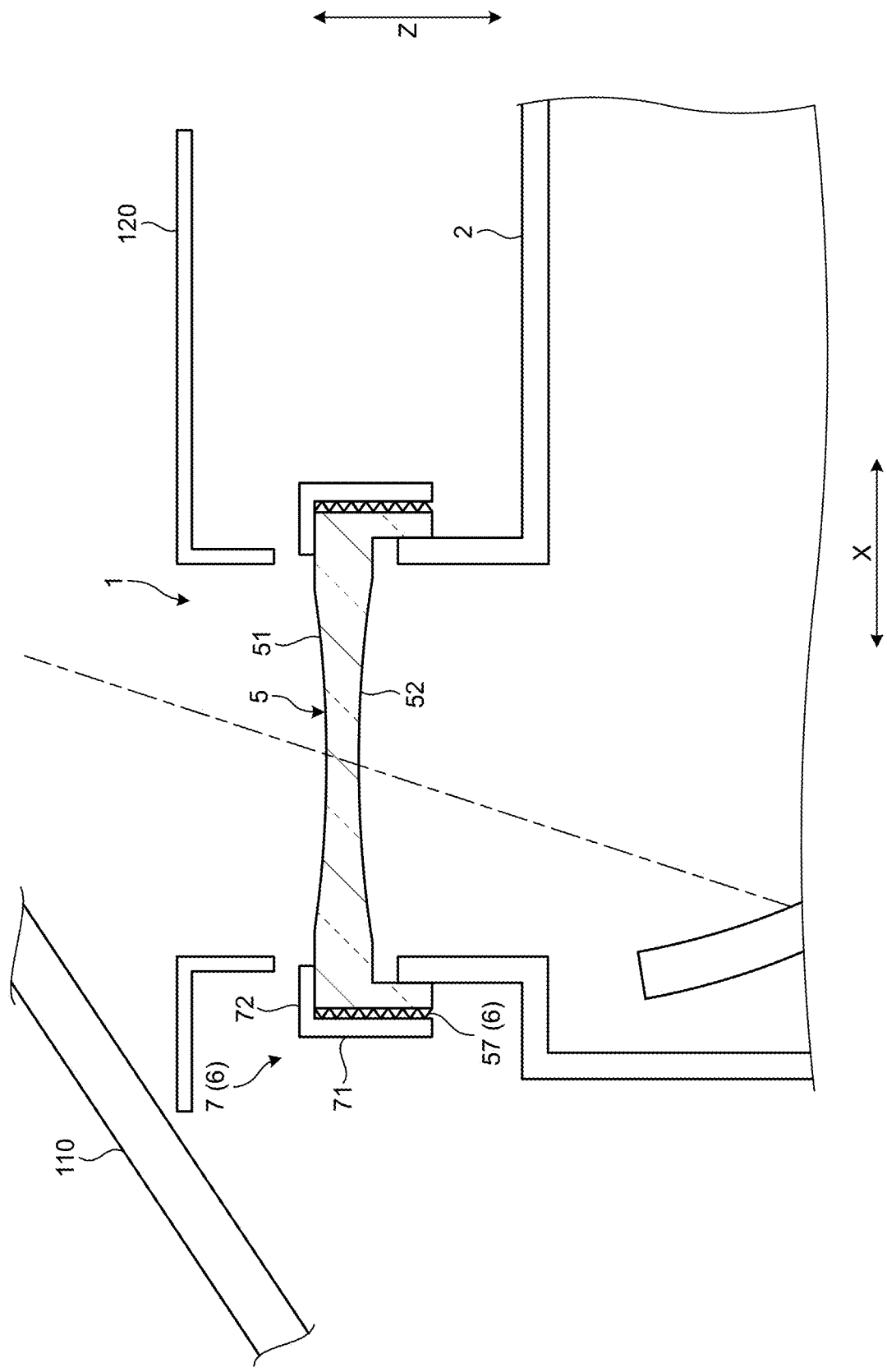
FIG. 5 is a cross-sectional view of the vehicle display device according to the embodiment.

The vehicle display device 1 illustrated in FIG. 5 includes a frame member 7 and an adhesive 57 as the suppression means 6. The adhesive 57 adheres the frame member 7 to the cover 5. The illustrated adhesive 57 is filled between the end surface 53 and the side wall 71 of the frame member 7. The value of the refractive index of the adhesive 57 is a value that can reduce the reflectance on the end surface 53 as compared with a case where the space between the end surface 53 and the frame member 7 is an air layer. The value of the refractive index of the adhesive 57 is selected to be able to sufficiently reduce the reflection of light at the end surface 53. The refractive index of the adhesive 57 is preferably equivalent to the refractive index of the cover 5. The adhesive 57 can suppress reflection of light on the end surface 53 and guide light to the frame member 7.

As described below, there is a plurality of paths conceivable as paths along which the reflected light travels toward the eye point EP. For example, as illustrated in FIG. 6, when the external light L1 is reflected by the end surface 53 of the cover 5, there is a path taken by the reflected light Lr to be reflected toward the eye point EP by the reflection surface 110*a* of the windshield 110.

In addition, as illustrated in FIG. 7, in a case where the external light L1 is reflected by the end surface 53, there is a path taken by the reflected light Lr to be directly incident on the eye point EP. The similar applies to beams of the stray light L2 and L3, and there are paths including: a path taken by the reflected light to be reflected by the windshield 110 toward the eye point EP; and a path taken by the reflected light to be directly incident on the eye point EP.

In addition, there are various paths of the reflected light according to the position of the eye point EP. FIG. 8 illustrates an eyellipse EL of the vehicle 100. The eyellipse EL has an upper end position ELu and a lower end position ELd, being positions in the vehicle up-down direction Z. A visible range of the end surface 53 varies between a case where the eye point EP is at the upper end position ELu and a case where the eye point EP is at the lower end position ELd.

FIG. 9 illustrates a visible range 53*v* on the end surface 53 visible from the upper end position ELu. The visible range 53*v* indicates a range visible from the driver, being a range in the vehicle up-down direction Z. When the driver's eyes are at the upper end position ELu of the eyellipse EL, the driver can view the visible range 53*v* via the reflection surface 110*a* of the windshield 110. In other words, among the entire range of the end surface 53, the visible range 53*v* is a range capable of reflecting the light toward the upper end position ELu.

In contrast, in a case where the driver's eyes are at the lower end position ELd, a visible range would be only a narrow range in the vicinity of the lower end 53*d* on the end surface 53. That is, in the case where the eye point EP is at the lower end position ELd, the range visible from the driver is narrower than the case where the eye point EP is at the upper end position ELu.

The cover 5 may be designed to be able to suppress reflected light directed toward the eye point EP even under the most severe conditions. For example, the cover 5 may be designed based on the positional relationship of each part when the eye point EP is at the upper end position ELu as described below.

FIG. 10 illustrates an example of the cover 5. The cover 5 illustrated in FIG. 10 includes, as a suppression means, a slope 58 in which the end surface 53 is inclined. The slope 58 is inclined so as to be more away from a center C1 of the cover 5 in a direction from the outer surface 51 toward the inner surface 52. An inclination angle θ of the slope 58 with respect to a reference line AX is determined so as to be able to suppress the generation of reflected light directed toward the eye point EP. The reference line AX is, for example, the vehicle up-down direction Z. The lower limit value of the inclination angle θ is determined based on an imaginary line IL described below, for example.

The imaginary line IL illustrated in FIG. 10 is determined from the upper end position ELu of the eyellipse EL and the position of a lower end 130*a* of the protective facing member 130. The imaginary line IL is an optical path of the lower end 130*a* reflected to the upper end position ELu by the reflection surface 110*a* of the windshield 110. In the cross section illustrated in FIG. 10, the imaginary line IL is inclined at an angle θ1 with respect to the reference line AX. The inclination angle θ of the slope 58 is an angle larger than the angle θ1, for example. The slope 58 can effectively suppress generation of reflected light directed toward the eyellipse EL.

The slope 58 illustrated in FIG. 10 is provided on a front end surface 53F in the vehicle front-rear direction X. Note that the slope 58 may be provided on left and right end surfaces 53 of the cover 5, or may be provided on a rear end surface 53R in the vehicle front-rear direction X.

As illustrated in FIG. 11, the position of the protective facing member 130 may be adjusted as the suppression means 6. The protective facing member 130 illustrated in FIG. 11 is disposed at the rear of a position 130*b*, facing the tubular portion 21 of the housing 2, in the vehicle. The position of the protective facing member 130 is set so as not to allow the imaginary line IL to cross the front end surface 53F, for example.

As illustrated in FIG. 12, the cover 5 may be extended in accordance with the position of the protective facing member 130. The cover 5 illustrated in FIG. 12 has an extension 5*x* as the suppression means 6. The extension 5*x* is located in front of the protective facing member 130 in the vehicle front-rear direction X. The front end surface 53F is located at front with respect to a position 53*a*, facing the protective facing member 130, in the vehicle. The position of the front end surface 53F is set so as not to allow the front end surface 53F to cross the imaginary line IL, for example. Note that the suppression means 6 illustrated in FIGS. 10 to 12 may be combined with each other.

As described above, the vehicle display device 1 according to the present embodiment includes the housing 2, the image display device 3, the mirror 4, the cover 5 which is transparent, and the suppression means 6. The housing 2 is mounted on vehicle 100 and has the opening 21*a* facing the windshield 110. The image display device 3 is disposed inside the housing 2 and outputs the display light Lt of an image. The mirror 4 is disposed inside the housing 2 and faces the windshield 110 through the opening 21*a*. The mirror 4 reflects the display light Lt toward the windshield 110. The cover 5 is disposed at the opening 21*a* and has a free-form surface formed to have an optical function. The suppression means 6 is disposed at the edge of the cover 5 and suppresses reflection of light on the end surface 53 of the cover 5. The vehicle display device 1 of the present embodiment suppresses reflection of light on the end surface 53, making it possible to improve the visibility of the virtual image Vi.

The suppression means 6 is, for example, the frame member 7 that covers the edge of the cover 5. The frame member 7 includes a side wall 71 and a top wall 72. The side wall 71 faces the end surface 53 of the cover 5 and covers the end surface 53. The top wall 72 covers the edge of the cover 5 from a side of the windshield 110. The frame member 7 can suppress reflection of light on the end surface 53. For example, the frame member 7 prevents incidence of light on the end surface 53, making it possible to suppress reflection as a result. In addition, the top wall 72 of the frame member 7 can block reflected light directed toward the eye point EP.

The suppression means 6 is, for example, the texturing 55 applied to the end surface 53 of the cover 5. The texturing 55 diffuses light in the end surface 53 and can suppress reflection toward the eye point EP.

The suppression means 6 is, for example, the slope 58 in which the end surface 53 of the cover 5 is inclined. The slope 58 is inclined so as to be more away from a center C1 of the cover 5 in a direction from the outer surface 51 toward the inner surface 52. The slope 58 can suppress reflection directed toward the outside of the housing 2.

The cover 5 need not include the fitting portion 54. In this case, for example, the housing 2 preferably has a holding structure of holding the cover 5 or a positioning structure of positioning the cover 5.

The contents disclosed in the above embodiment can be executed in appropriate combination with each other.

The vehicle display device according to the embodiment includes a suppression means, which is disposed at an edge of a cover having an optical function so as to suppress reflection of light on an end surface of the cover. The vehicle display device according to the embodiment has an effect of suppressing reflection on the end surface of the cover.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
    a housing mounted on a vehicle and comprising a main body and a tubular portion protruding upward from the main body, the housing having an opening at a distal end of the tubular portion facing a windshield;
    an image display device that is disposed inside the housing and outputs display light of an image;
    a mirror that is disposed inside the housing, faces the windshield through the opening, and reflects the display light toward the windshield;
    a cover that is transparent, disposed at the opening and having a free-form surface formed to have an optical function, wherein the cover comprises a main body, and a fitting portion protruding from an edge of the main body and being fitted around an outside of the tubular portion of the housing; and
    a suppression means that is disposed at an edge of the cover and suppresses reflection of light on an end surface of the cover,
    wherein the suppression means is a frame member that covers the edge of the cover, and
    the frame member includes a side wall that faces the end surface of the cover and covers the end surface, and a top wall that covers the edge from a side of the windshield.

2. The vehicle display device according to claim 1, wherein texturing is applied to the end surface of the cover.

3. The vehicle display device according to claim 2, wherein the side wall covers all the end surfaces of the cover.

4. The vehicle display device according to claim 1, wherein the cover includes an outer surface facing the windshield and an inner surface facing the mirror, the end surface of the cover is a slope which is inclined, and
    the slope is inclined so as to be more away from a center of the cover in a direction from the outer surface toward the inner surface.

5. The vehicle display device according to claim 4, wherein the side wall covers all the end surfaces of the cover.

6. The vehicle display device according to claim 1, wherein the side wall covers all the end surfaces of the cover.

7. The vehicle display device according to claim 1, wherein the free-form surface of the cover is formed to have an optical function of enlarging the image.

8. The vehicle display device according to claim 1, wherein the end surface of the cover is a side surface that is continuous from the main body to the fitting portion.

9. The vehicle display device according to claim 8, wherein texturing is applied to the end surface of the cover, the texturing being configured to diffuse the light on the end surface of the cover.

10. The vehicle display device according to claim 8, wherein the end surface of the cover is a slope which is inclined toward a center of the cover.

* * * * *